Figures 1, 2, 3:
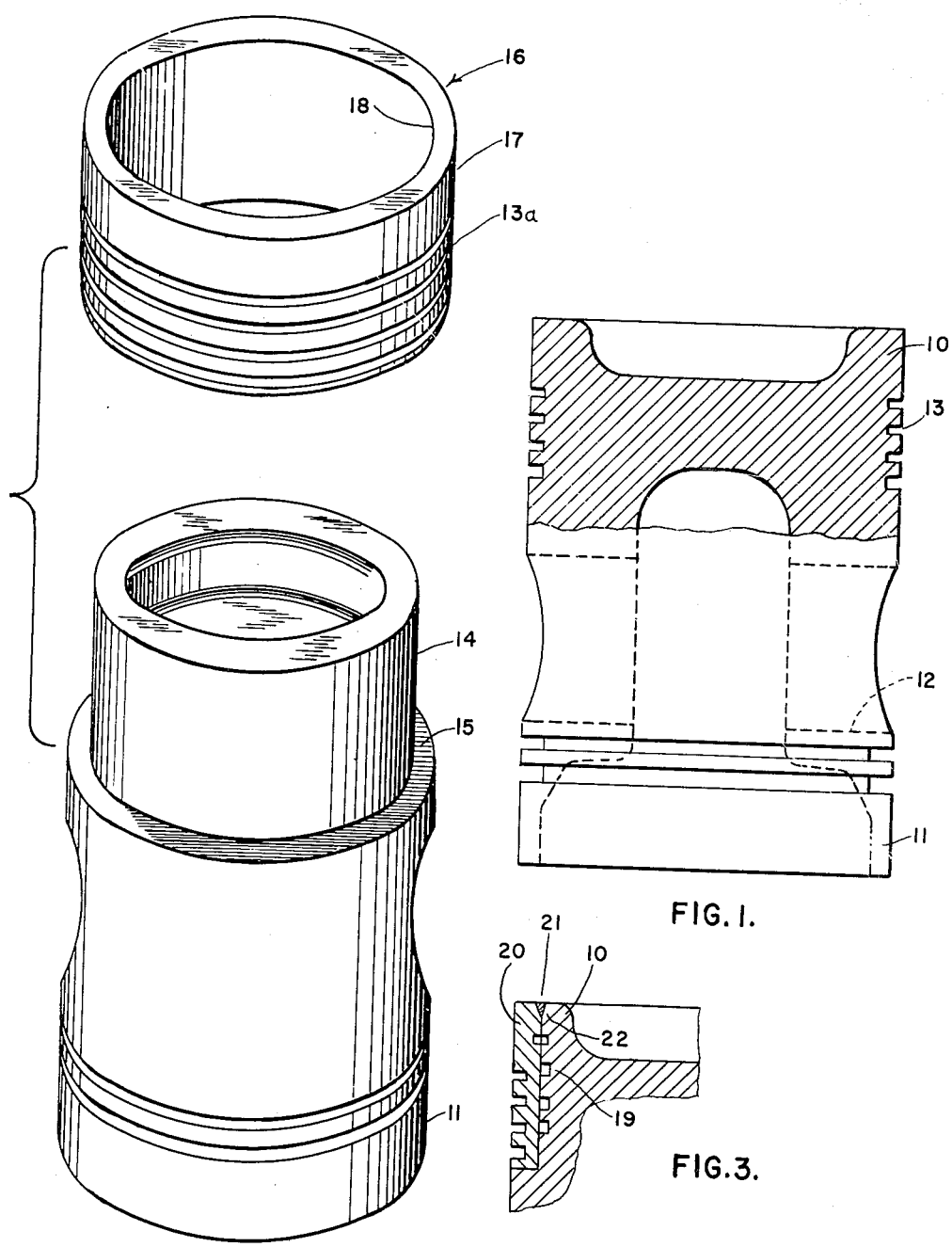

July 3, 1956

C. L. SHEEN 2,752,668

METHOD OF SALVAGING PISTONS

Filed Feb. 25, 1953

CLIFFORD L. SHEEN.
INVENTOR

BY Maurice W. Grady
ATTORNEY

United States Patent Office 2,752,668
Patented July 3, 1956

2,752,668
METHOD OF SALVAGING PISTONS

Clifford L. Sheen, Schenectady, N. Y., assignor to Alco Products, Incorporated, New York, N. Y., a corporation of New York Application February 25, 1953, Serial No. 338,716

2 Claims. (Cl. 29—401)

This invention relates to a method of salvaging pistons for internal combustion engines, and particularly to heavy duty pistons such as used in engines employed on diesel-electric locomotives.

In the so-called "solid" piston, which has an integral side wall, the ring grooves are formed directly in the wall. These grooves become worn in service so that the rings no longer function properly. Attempts have been made to salvage such pistons by welding up the original grooves and then re-cutting new grooves therein. But this has proved to be a costly and time-consuming process. Furthermore, the re-cut grooves must comply with high precision requirements which, in the case of most railway repair shops, is impractical and too costly to achieve. To return the pistons to the original builder, who is equipped to perform the operation, is a costly alternative.

The principal object of this invention is to disclose a method of salvaging pistons whose ring grooves have become worn. A further object is to disclose that such a piston may be salvaged by forming a recess in the head of the piston, which removes the portion of the piston in which the grooves are located, and then shrinking on to the piston an annular ring carrier which has grooves premachined therein, said carrier having predetermined critical diametrical dimensions. Still a further object is to disclose that such a piston may be salvaged by machining away that portion of the piston in which the original grooves are formed so that a recess of predetermined dimensions is provided and then shrinking into such recess an annular ring carrier whose inside diameter, before expansion in the shrinking-on step, is less by a predetermined amount than the outside diameter of the recessed piston portion and whose outside diameter, before such expansion, is less by a predetermined amount than the outside diameter of the piston body proper. Still a further object is to disclose a method of salvaging pistons which have a ring carrier thereon as part of their original construction, such method consisting of first removing the original ring carrier by machining or otherwise and then shrinking into the recess remaining a premachined annular ring carrier having inside and outside diameters of predetermined dimensions such that upon the completion of cooling, the outside diameter becomes axially continuous with the periphery of the main piston body. Other and further objects of the present invention will be apparent from the following description, the accompanying drawings, and the appended claims.

In the drawings, Fig. 1 shows a solid type piston partly in cross section;

Fig. 2 shows an exploded view of a solid type piston in perspective as prepared for the invented method; and, Fig. 3 shows a fragmentary cross sectional view of a ring carrier type piston.

Referring to the drawings, there is shown in Fig. 1 a hollow "solid" type piston comprising a head portion 10, a skirt 11, and transverse bore 12 for the mounting of a conventional wrist pin (not shown). A plurality of grooves 13, four in the illustrative embodiment, are formed in the outer wall of the head portion for the reception of piston rings (not shown). These grooves become worn in service so that the rings do not function properly. Therefore, a piston with accurately sized dimensions must then be installed.

According to the practice of the invention, a piston with worn grooves is set up in a lathe and a recess is turned out at the upper end of the head portion (see Fig. 2). The portion thus removed, of course, includes the worn grooves. Such recess is defined by axial wall 14 and radial wall 15. Close tolerances must be followed. In one well known piston design, the outside diameter of the original piston was 12.446". After the recess was cut therein in the salvaging operation, the outside diameter of the reduced portion was 10.686". The axial length of the recess was in that case 5.357". The outside diameter of the main body of the piston of course remained at 12.446".

A premachined cylindrical ring carrier, generally indicated at 16 and including ring grooves 13a, is then provided to be shrunk into the recess. This carrier has an inside diameter slightly less than the outside diameter of wall 14 of the recessed head portion and an outside diameter which is slightly less than the outside diameter of the head portion 10 of the piston. In the case of the piston described in the preceding paragraph, the inside diameter of the carrier was 10.666" and the outside diameter was 12.429". That is to say, the carrier before assembly had an inside diameter of .020" less and an outside diameter of .017" less than the inside and outside diameters of the recessed portion and the head portion respectively. Preferably the ring carrier is tapered slightly on its outer wall 17 so that it has a greater thickness at the bottom than at the top to allow for expansion at the top due to the heat of the combustion gases when in operation. The inner wall 18 is preferably normal to the diameter of the ring or parallel to its longitudinal axis. In the specific illustration, the radial dimension of the recess was .880" whereas the ring carrier's radial thickness at its bottom end was .8815".

The ring carrier in the specific case mentioned was of an aluminum alloy composition. It was heated to a maximum temperature of substantially 400° F. and maintained at that temperature for substantially one hour. As thus expanded, it was slipped over the top of the piston into the recess and allowed to cool. As the dimensions involved were predetermined and the shrinkage characteristics of the aluminum alloy was known, the carrier shrunk to desired size so that its periphery became axially continuous or flush with the cylindrical periphery of the head portion of the piston. No machining was necessary after completion of the shrinkage. The carrier undergoes compression since the net expansion imparted to its inside diameter (after the shrinking has been completed) sufficiently exceeds the net expansion or "stretch" imparted to its outside diameter so that the carrier wall thickness is reduced. In the specific case, the net increase of the inside diameter of the carrier was .020" whereas the net increase of the outside diameter was .017" after assembly.

The invented method may be applied not only to the solid type piston as hereinbefore described but also to the so-called "oil cooled" piston as partially shown in Fig. 3. Internal oil grooves 19 are provided in the piston of the "oil-cooled" type for the passage of cooling oil therethrough. Such pistons normally have a ring carrier 20 which closes the oil passages. In this type piston, the method is the same as heretofore described with two additional steps. After the old ring carrier has been turned off and the new one applied as heretofore described, it is necessary to weld the joint 21 between the carrier and the piston to prevent the passage of combustion gases into the cooling grooves 19. In salvaging such pistons the new ring carrier is provided with an axial length slightly greater than the piston recess so that after the weld 22 has been deposited to a depth slightly above the piston crown, the excess weld and carrier may be turned off to the desired contour to provide a smooth piston crown with the carrier, weld, and piston flush with each other.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A method of salvaging pistons for internal combustion engines which comprises forming a recess of predetermined dimensions on the piston head to remove the ring grooves therein, providing a separate ring carrier with ring grooves premachined therein and with a thickness greater than the thickness of the piston recess by a predetermined amount, said carrier having an outside diameter less than the diameter of the main body of the piston by a predetermined amount and an inside diameter less than the outside diameter of the reduced portion of the piston by a predetermined amount, heating said carrier to impart sufficient expansion to its outside and inside diameters so that they will be greater than the diameters of the main body of the piston and of the reduced portion of the piston respectively; and placing said hot expanded carrier in the piston recess and allowing it to cool and shrink thereon whereby the carrier is compressed to become denser in composition and its outer surface shrinks to become axially continuous with the outer surface of the main body of the piston.

2. A method of salvaging pistons for internal combustion engines which comprises forming a recess of predetermined size in the piston head to remove the ring grooves therein, providing a separate ring carrier composed of an alloy having a known coefficient of thermal expansion and with ring grooves premachined therein, said carrier having an inside diameter less than the outside diameter of the reduced portion of said piston by a predetermined amount and an outside diameter less than the outside diameter of the main body of the piston by a predetermined amount and having a thickness greater than the thickness of said recess, heating the ring carrier to a predetermined temperature; and placing the hot ring carrier in the piston recess and allowing it to shrink whereby the ring carrier assumes final inside and outside diametrical dimensions greater than its corresponding original diametrical dimensions and a final thickness less than its original thickness to present an outer surface flush with the main body of the piston.

References Cited in the file of this patent

UNITED STATES PATENTS

| | | |
|---|---|---|
| 1,739,248 | Martin | Dec. 10, 1929 |
| 1,820,069 | Herr | Aug. 25, 1931 |
| 2,066,802 | Rowntree | Jan. 5, 1937 |
| 2,301,495 | Abegg | Nov. 10, 1942 |